(12) United States Patent
Oga et al.

(10) Patent No.: US 9,649,998 B2
(45) Date of Patent: May 16, 2017

(54) WIRE HARNESS WITH METAL PIPE AND CAP

(71) Applicant: Yazaki Corporation, Minato-ku, Tokyo (JP)

(72) Inventors: Tatsuya Oga, Kosai (JP); Hiroyuki Yoshida, Kosai (JP)

(73) Assignee: Yazaki Corporation, Tokyo (JP)

( * ) Notice: Subject to any disclaimer, the term of this patent is extended or adjusted under 35 U.S.C. 154(b) by 125 days.

(21) Appl. No.: 14/290,147

(22) Filed: May 29, 2014

(65) Prior Publication Data

US 2014/0262495 A1    Sep. 18, 2014

Related U.S. Application Data

(63) Continuation of application No. PCT/JP2012/081725, filed on Nov. 30, 2012.

(30) Foreign Application Priority Data

Nov. 30, 2011    (JP) .................................. 2011-261644

(51) Int. Cl.
*H01B 7/00*    (2006.01)
*H02G 3/04*    (2006.01)
*B60R 16/02*    (2006.01)

(52) U.S. Cl.
CPC ....... *B60R 16/0215* (2013.01); *H02G 3/0481* (2013.01)

(58) Field of Classification Search
CPC .............. B60L 11/1803; B60L 2220/46; B60L 2270/145; B60R 16/0215; H01B 7/17;
(Continued)

(56) References Cited

U.S. PATENT DOCUMENTS 3,742,559 A * 7/1973 Punako .................. F16G 11/04
24/16 PB
5,188,451 A * 2/1993 Shanks ......................... 362/223
(Continued)

FOREIGN PATENT DOCUMENTS

CN    102055122 A    5/2011
CN    102088171 A    6/2011
(Continued)

OTHER PUBLICATIONS

International Search Report dated Mar. 5, 2013 issued in International Application No. PCT/JP2012/081725 (PCT/ISA/210).
(Continued)

*Primary Examiner* — Timothy Thompson
*Assistant Examiner* — Guillermo Egoavil
(74) *Attorney, Agent, or Firm* — Sughrue Mion, PLLC

(57) ABSTRACT

A wire harness includes conducting paths, a metal pipe into which the conducting paths are inserted, and a conducting path protective cap which includes a through hole for the conducting paths, and an engaging part which is engaged with a terminal part of the metal pipe. The terminal part of the metal pipe has a ring-like cap engagement space formed by crushing the terminal part towards a predetermined direction from a pipe outer surface of the metal pipe. The ring-like cap engagement space includes a reduced space and an enlarged space formed due to a crushing of the terminal part. The reduced part is formed by narrowing a part of a gap between the conducting paths and the pipe inner surface due to the crushing, and the enlarged space is formed by enlarging a part of the gap in accordance with a formation of the reduced space.

4 Claims, 3 Drawing Sheets

(58) Field of Classification Search
CPC ... H01B 7/20; H01B 7/28; H01R 4/64; H01R 9/032; H01R 13/52; H01R 13/648; H01R 13/5205; H01R 13/5808; H01R 13/6592; H01R 13/5208; H01R 2201/26; H02G 3/30; H02G 3/088; H02G 3/0481; H02G 3/0487; H05K 9/00; Y02T 10/7005; Y10T 29/49117
USPC ....... 174/70 R, 72 A, 353, 359, 391; 29/825; 307/10.1
See application file for complete search history.

(56) References Cited

U.S. PATENT DOCUMENTS

| | | | | |
|---|---|---|---|---|
| 6,126,477 | A * | 10/2000 | Smith | H01R 13/6592 439/447 |
| 6,602,221 | B1 * | 8/2003 | Saravia | A61M 3/0258 604/31 |
| 7,094,970 | B2 | 8/2006 | Kihira | |
| 2002/0157843 | A1 * | 10/2002 | Fukushima | H01R 9/032 174/353 |
| 2004/0099427 | A1 | 5/2004 | Kihira | |
| 2007/0007038 | A1 * | 1/2007 | Cox | H02G 3/088 174/650 |
| 2011/0031809 | A1 * | 2/2011 | Yoshida et al. | 307/42 |
| 2011/0094796 | A1 | 4/2011 | Toyama et al. | |
| 2011/0133548 | A1 | 6/2011 | Toyama et al. | |
| 2013/0000975 | A1 | 1/2013 | Igarashi et al. | |
| 2013/0008711 | A1 | 1/2013 | Toyama et al. | |
| 2013/0269981 | A1 * | 10/2013 | Shiga | B60R 16/0215 174/136 |
| 2014/0165392 | A1 * | 6/2014 | Toyama | B60R 16/0215 29/825 |
| 2015/0107871 | A1 * | 4/2015 | Adachi | B60R 16/0215 174/102 C |

FOREIGN PATENT DOCUMENTS

| | | | |
|---|---|---|---|
| JP | 7-183063 A | | 7/1995 |
| JP | 2004-171952 A | | 6/2004 |
| JP | 2007-26821 A | | 2/2007 |
| JP | 2007026821 A | * | 2/2007 |
| JP | 2011-193677 A | | 9/2011 |
| JP | WO2011114802 A1 | * | 9/2011 |
| WO | 2011/114802 A1 | | 9/2011 |
| WO | WO2011114802 A1 | * | 9/2011 |
| WO | 2011/145232 A1 | | 11/2011 |

OTHER PUBLICATIONS

Written Opinion dated Mar. 5, 2013 issued in International Application No. PCT/JP2012/081725 (PCT/ISA/237).

Communication dated Oct. 6, 2015 issued by Japanese Intellectual Property Office in counterpart Japanese Patent Application No. 2011-261644.

Communication from the State Intellectual Property Office of P.R. China dated Aug. 17, 2015 in a counterpart Chinese application No. 201280059385.8.

* cited by examiner

WIRE HARNESS WITH METAL PIPE AND CAP

CROSS REFERENCE TO RELATED APPLICATIONS

This application is a continuation of PCT application No. PCT/JP2012/081725, which was filed on Nov. 30, 2012 based on Japanese Patent Application (No. 2011-261644) filed on Nov. 30, 2011, the contents of which are incorporated herein by reference.

BACKGROUND OF THE INVENTION

1. Field of the Invention

The present invention relates to a wire harness including a plurality of conducting paths, a metal pipe and a cap.

2. Description of the Related Art

A high voltage wire harness is used to electrically connect devices of a hybrid vehicle or an electric vehicle, namely, devices such as a motor unit, an inverter unit or a battery in the vehicle.

A wire harness disclosed in JP-A-2004-171952 includes three electric wires which are electrically connected between devices, and a metal pipe which accommodates and shields the three electric wires for most of the full length.

The metal pipe has conductivity to have a shielding function. In order to reduce the diameter of the metal pipe, the metal pipe has such a size that only three electric wires can be inserted.

SUMMARY OF THE INVENTION

In the above-mentioned background technique, when the metal pipe is included in the wire harness in construction, the metal pipe is used after a necessary length of the metal pipe is cut. Therefore, at a terminal opening edge of the metal pipe, an edge portion (including burr or the like) might occur. Because the coatings of the electric wires might be hurt when this edge portion contacts with the coatings, it is considered to be necessary to engage a coating-protective cap with the terminal opening of the metal pipe.

In order to reduce the diameter of the metal pipe, the metal pipe whose inside diameter is as small as possible is used. Therefore, because the gap between the electric wires and the inner surface of the metal pipe is small, there is the following problem. That is, it is difficult to ensure a space where the coating-protective cap is engaged.

The present invention is made in view of the above described circumstances, and an object of the invention is to provide a wire harness so that a coating-protective cap can be engaged without upsizing the metal pipe.

An aspect of the present invention provides a wire harness, including: a plurality of conducting paths; a metal pipe into which the plurality of conducting paths are inserted; and a conducting path protective cap which includes a through hole for the plurality of conducting paths, and an engaging part which is engaged with a terminal part of the metal pipe, wherein the terminal part of the metal pipe has a ring-like cap engagement space between the plurality of conducting paths and a pipe inner surface of the metal pipe, the ring-like cap engagement space being formed by crushing the terminal part towards a predetermined direction from a pipe outer surface of the metal pipe, and the ring-like cap engagement space includes a reduced space and an enlarged space formed due to a crushing of the terminal part, wherein the reduced part is formed by narrowing a part of a gap between the plurality of conducting paths and the pipe inner surface due to the crushing, and the enlarged space is formed by enlarging a part of the gap in accordance with a formation of the reduced space.

The wire harness may be configured so that the metal pipe has a size that the part of the gap before the enlarged spaces is formed is smaller than a thickness of the engaging part of the conducting path protective cap.

The wire harness may be configured so that the terminal part of the metal pipe is deformed in a given shape to conform to the number of the plurality of conducting paths which is inserted in the metal pipe by varying crushing points, the number of crushing points and crushing directions of the terminal part.

The wire harness may be configured so that the plurality of conducting paths includes two conducting paths aligned each other, and the terminal part of the metal pipe is deformed in an oval shape due to the crushing of the terminal part to form a pair of reduced spaces and a pair of enlarged spaces between the two conducting paths and the pipe inner surface of the metal pipe.

According to the aspect of the present invention having the above configuration, the ring-like cap engagement space is formed at the terminal part of the metal pipe. The ring-like cap engagement space is formed by crushing the terminal part of the metal pipe. The ring-like cap engagement space includes a reduced space and an enlarged space. The reduced space is formed due to the crushing of the terminal part. The enlarged space is formed with the formation of the reduced space.

When the metal pipe of a fixed inside diameter is crushed from a predetermined direction, due to the crushing, distortion forces act on parts which are not crushed, and this leads to the formation of the enlarged spaces.

Because the metal pipe has the ring-like cap engagement space at the terminal part, the coating-protective cap can be engaged without upsizing the inside diameter.

According to the aspect of the present invention, a wire harness can be provided so that the coating-protective cap can be engaged without upsizing the inside diameter of the metal pipe.

According to the configuration as mentioned above, a wire harness which uses a metal pipe whose diameter is small can be provided. Thereby, for example, when the wire harness is wired under the bottom floor of a vehicle, it is possible to wire while the distance from the ground is increased, and an injury is hard to be caused.

According to the configuration as mentioned above, a wire harness can be provided in conformity with the wired number of conducting paths which are inserted in the metal pipe.

BRIEF DESCRIPTION OF THE DRAWINGS

FIGS. 2A to 2D show a processing of the metal pipe terminal part, in which FIG. 2A is an end view before being crushed, FIG. 2B is an end view after being crushed, FIG. 2C is a horizontal sectional view of FIG. 2A, and FIG. 2D is a horizontal sectional view of FIG. 2B and a sectional view of a coating-protective cap.

DETAILED DESCRIPTION OF THE EXEMPLARY EMBODIMENTS

In a wire harness, a terminal part of a metal pipe constructing the wire harness is crushed to form a ring-like cap engaging space where a conducting path protective cap is engaged.

Embodiment

Figure 1A:
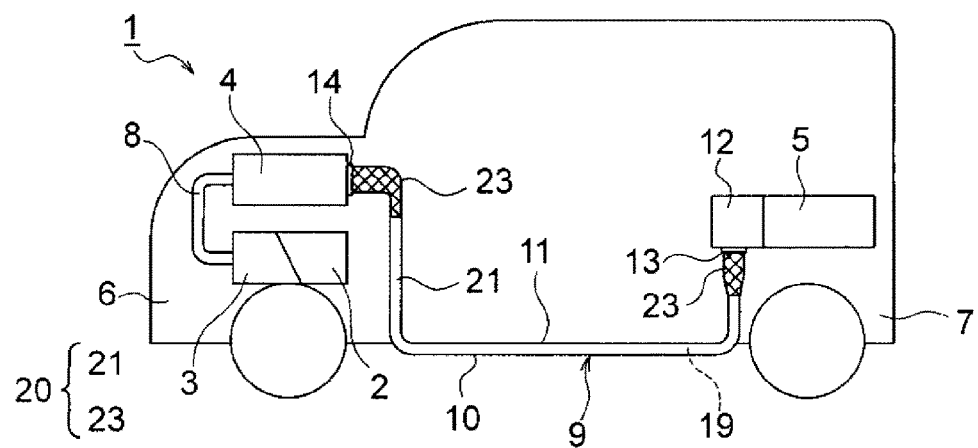
FIG. 1A is a schematic view of a vehicle in which a wire harness according to an embodiment of the present invention is wired.
Figure 1B:
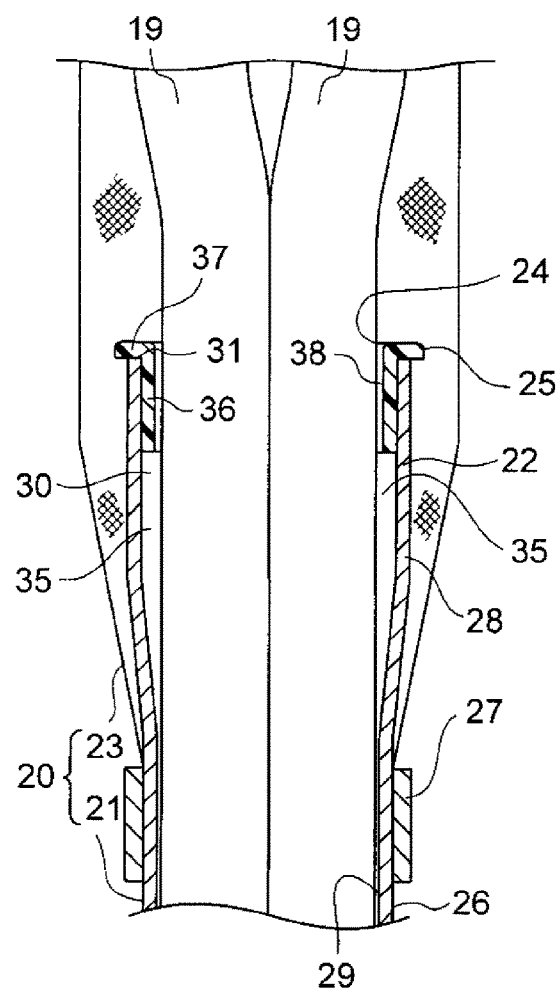
FIGS. 1B and 1C are sectional views of a metal pipe terminal part of the wire harness.
Figure 1C:
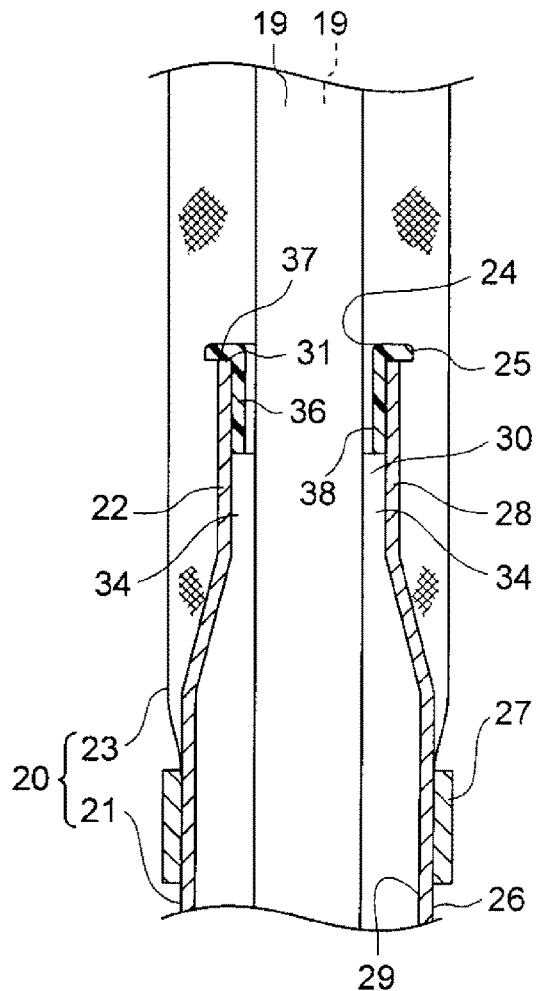
Figure 2A:
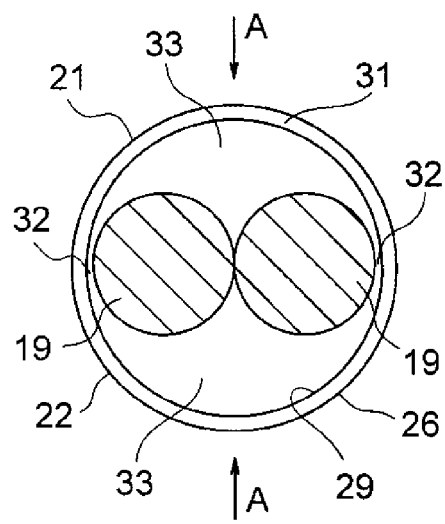
Figure 2B:
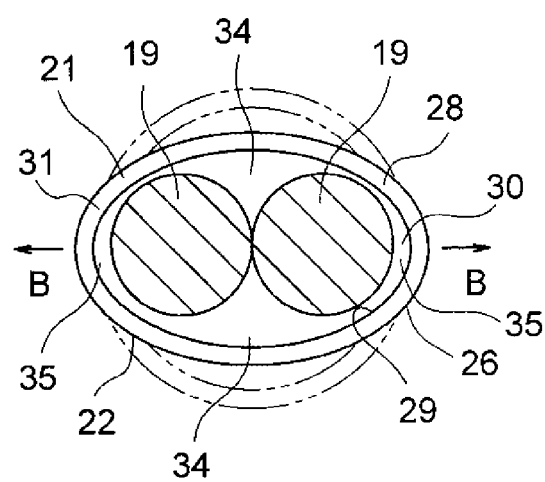
Figure 2C:
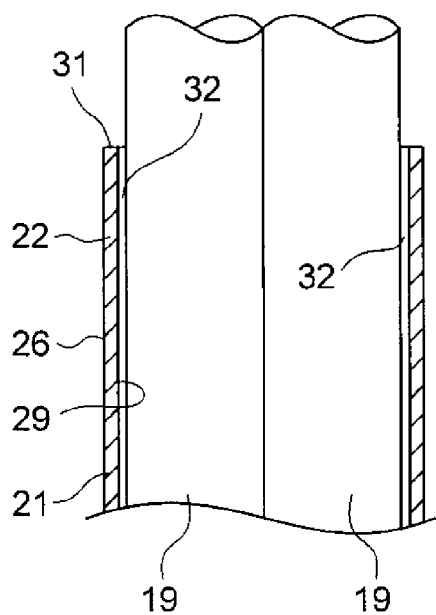
Figure 2D:
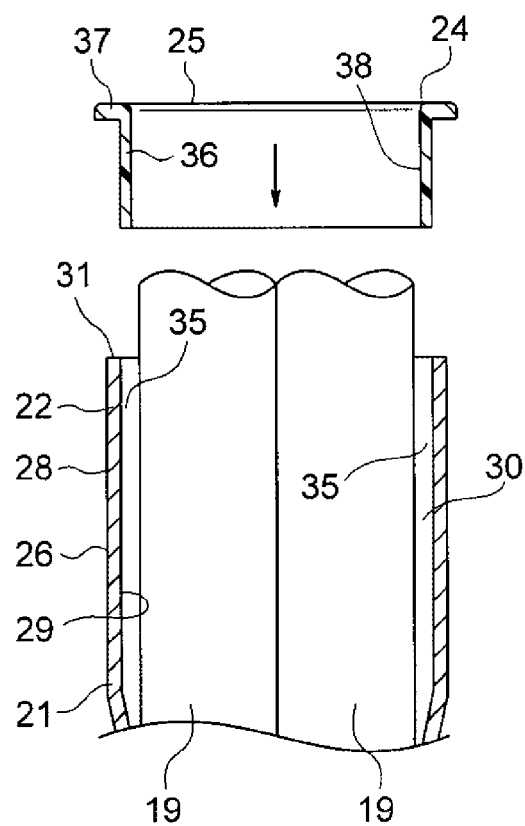
Figure 3A:
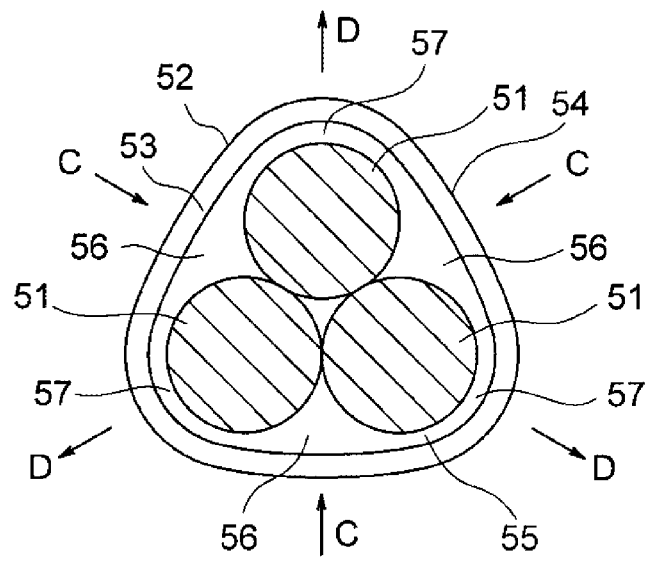
FIG. 3A is a sectional view in a processing of a metal pipe terminal part according to another example when there are three high voltage electric wires.
Figure 3B:
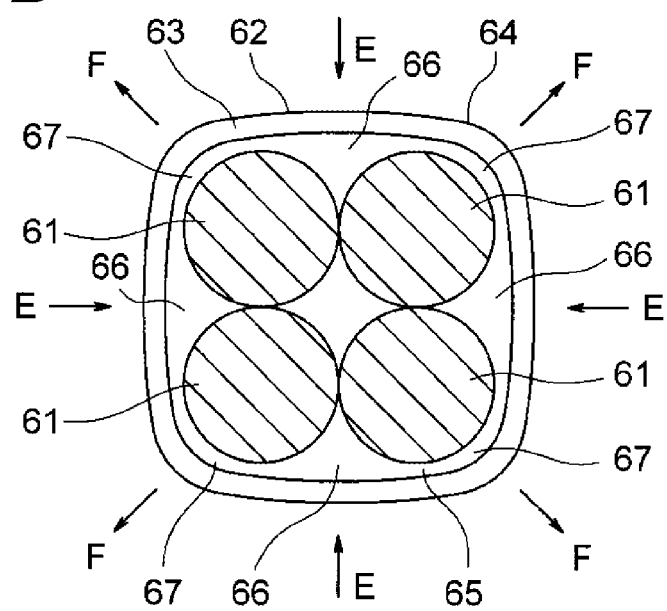
FIG. 3B is a sectional view in a processing of a metal pipe terminal part according to another example when there are four high voltage electric wires.

Hereinafter, an embodiment of the present invention is described with reference to the drawings. FIG. 1A is a schematic view of a vehicle in which a wire harness according to an embodiment of the present invention is wired. FIGS. 1B and 1C are sectional views of a metal pipe terminal part of the wire harness. FIGS. 2A to 2D show a processing of the metal pipe terminal part, in which FIG. 2A is an end view before being crushed, FIG. 2B is an end view after being crushed, FIG. 2C is a horizontal sectional view of FIG. 2A, and FIG. 2D is a horizontal sectional view of FIG. 2B and a sectional view of a coating-protective cap. FIG. 3A is a sectional view in a processing of a metal pipe terminal part according to another example when there are three high voltage electric wires. FIG. 3B is a sectional view in a processing of a metal pipe terminal part according to another example when there are four high voltage electric wires.

In the description, an example in which a wire harness middle member and a wire harness according to the embodiment is applied to a hybrid vehicle (or an electric vehicle) is given and described.

FIG. 1A shows a hybrid vehicle 1. The hybrid vehicle 1 is a vehicle which is driven by mixing two powers of an engine 2 and a motor unit 3, and the electric power from a battery 5 (battery pack) will be supplied to the motor unit 3 via an inverter unit 4. The engine 2, the motor unit 3 and the inverter unit 4 are mounted in an engine room 6 at the position of front wheels or the like in the embodiment. The battery 5 is mounted in a vehicle rear part 7 of rear wheels or the like. The battery may be mounted in an indoor space which exists behind the engine room 6.

The motor unit 3 and the inverter unit 4 are connected by a high voltage wire harness 8. The battery 5 and the inverter unit 4 are connected by a high voltage wire harness 9. The wire harness 9 is constructed as a high voltage one. A middle part 10 of the wire harness 9 is wired at the ground side of a vehicle body floor 11. The wire harness 9 is wired generally in parallel with the vehicle body floor 11. The vehicle body floor 11 is a well-known body and is a so-called panel member, and through holes (their reference numbers are omitted) are formed at predetermined positions. The wire harness 9 is inserted through these through holes.

The wire harness 9 and the battery 5 are connected through a junction block 12 which the battery 5 is provided with. A back end 13 of the wire harness 9 is electrically connected to the junction block 12 by a well-known method. A front end 14 of the wire harness 9 is electrically connected to the inverter unit 4 by a well-known method.

The motor unit 3 includes a motor and a generator in construction. The inverter unit 4 includes an inverter and a converter in construction. The motor unit 3 is formed as a motor assembly including a shield casing. Also, the inverter unit 4 is formed as an inverter assembly including a shield casing. The battery 5 is a Ni-MH battery or Li-ion battery, and is modularized. An electricity accumulating device such as a capacitor may be used. The battery 5 shall not be particularly limited as long as the battery 5 may be used for the hybrid vehicle 1 or an electric vehicle.

First, the construction and structure of the wire harness 9 are described.

The wire harness 9 is used to electrically connect the inverter unit 4 to the battery 5, and includes two high voltage electric wires 19 (conducting paths), and a shielding member 20 which collectively covers and shields the two high voltage electric wires 19. The shielding member 20 includes a metal pipe 21 which accommodates and shields most of the full length of the two high voltage electric wires 19, and flexible braids 23 which are respectively connected and fixed into terminals parts 22 which are one end and the other end of the metal pipe 21. A conducting path protective cap 25 which has a curved surface 24 (or a taper) is provided at each of the terminal parts 22 of the metal pipe 21.

The high voltage electric wire 19 is a high voltage conducting path including a conductor and an insulator (coating), and is formed to have a length that is necessary for electrical connection. The conductor is made of copper, copper alloy, aluminum or aluminum alloy. The conductor may have either a conductor structure in which strands are twisted or a rod-like conductor structure whose cross section is a rectangular shape or a round shape. For example, a conductor structure with a rectangular single core or a round single core, and in this case, the electric wire itself becomes rod-like.

The high voltage electric wires 19 are used in the present embodiment, but the invention shall not be limited to this. That is, it is also possible to provide an insulator to a well-known bus bar to be used as a high voltage conducting path, or to use a high voltage coaxial combined conducting path which is constructed by coaxially combining n sets of circuits (n circuits) to one.

A predetermined length of the insulator at each of the ends, which are one end and the other end of the high voltage electric wire 19, is removed (not shown in the figure). From this removed portion, the conductor is exposed. The exposed conductor is provided with terminal metal fittings. The terminal metal fittings are provided as a part connected to a connecting part, which is not shown, of the inverter unit 4, or as a part connected to a connecting part, which is not shown, of the battery 5.

The metal pipe 21 and the braids 23 constructing the shielding member 20 are connected and fixed by a well-known method. The well-known method may be a connecting and fixing method in which a pipe outer surface 26 of the metal pipe 21 is covered with one end of the braid 23 and then the overlapping portion is crimped with a braid fixing ring 27, or a connecting and fixing method of bonding or welding the overlapping portion, or a connecting and fixing method of tape winding the overlapped portion.

The other end of the braid 23, although not particularly illustrated, is provided with a metal shell or a conductive resin shell. The metal shell is formed by forging a metal plate having conductivity or casting. The conductive resin shell is formed with resin molding using resin material having conductivity. The metal shell or the conductive resin shell is provided as a part which is connected and fixed to a shield casing or the like, which is not shown in the figure, of the inverter unit 4 or the battery 5.

The braid 23 is a pipe-like member for electromagnetic shielding, and is formed by using a lot of extra-fine strands that have conductivity, and knitting these strands into a pipe-like shape. As an example, the above strand may be an extra-fine strand including a metal strand such as an annealed copper strand.

Besides the braid 23, a metal foil alone, a metal foil unified with a resin film, or the like may be used.

In FIGS. 1A to 2D, the metal pipe 21 has a circular (refer to FIG. 2A) pipe body which is made of copper, copper alloy, aluminum or aluminum alloy. In the present embodiment, the metal pipe 21 has such a size that only two high voltage electric wires 19 can be inserted.

A terminal crushed part 28 which is formed when a crush is performed from a predetermined direction towards the pipe outer surface 26 is formed at each of the terminal parts 22 of the metal pipe 21. The terminal crushed part 28 is formed by being crushed to a generally oval shape (refer to FIG. 2B). At the terminal part 22, a ring-like cap engagement space 30 is formed at the side of a pipe inner surface 29 with the formation of the terminal crushed part 28.

By forming the terminal crushed part 28 at the metal pipe 21, and by forming the ring-like cap engagement space 30 with the formation of the terminal crushed part 28, it becomes possible in the present embodiment to engage the metal pipe 21 with the conducting path protective cap 25 even if the inside diameter of the metal pipe 21 is not upsized. That is, even if the metal pipe 21 which has such a size that only two high voltage electric wires 19 can be inserted is used, and even if the metal pipe 21 in which a small gap 32 to be described below gets narrower is used, the conducting path protective cap 25 can be engaged with the terminal part 22. The details are described as follows.

In FIG. 2A, the shape of an end surface 31 before the terminal part 22 of the metal pipe 21 is crushed is circular. The metal pipe 21 has such a size that only two high voltage electric wires 19 can be inserted as shown in FIGS. 2A and 2C. The two high voltage electric wires 19 are inserted into the metal pipe 21 in a state that these electric wires 19 are aligned.

The metal pipe 21 before being crushed has such a shape that a pair of small gaps 32 and a pair of big gaps 33 are formed between the two high voltage electric wires 19 and the pipe inner surface 29. In the metal pipe 21, the size of the small gaps 32 becomes smaller than the thickness of an engaging part 36 to be described below of the conducting path protective cap 25.

When the terminal part 22 of the metal pipe 21 is crushed from the arrow A direction, in particular, when the terminal part 22 is crushed by pressing the pipe outer surface 26 from the arrow A direction in accordance with the positions of the pair of big gaps 33, at this time, due to the crushing, distortion forces act on parts which are not crushed (the pair of small gaps 32). Herein, arrows B show acting directions.

When the terminal part 22 of the metal pipe 21 is crushed from the arrow A direction, as shown in FIG. 2B, the shape of the end surface 31 changes from a circle into an oval, and the terminal crushed part 28 is formed at the terminal part 22. At this time, regarding the pair of big gaps 33, because the gaps between the two high voltage electric wires 19 and the pipe inner surface 29 get narrower due to the crushing, a pair of reduced spaces 34 is formed. Further, because the gaps between the two high voltage electric wires 19 and the pipe inner surface 29 get wider since the crushing acts on the pair of small gaps 32, a pair of enlarged spaces 35 are formed. Herein, the arrows B show the enlarging directions.

When the shape of the end surface 31 is deformed from a circle into an oval, a ring-like (oval shape) cap engagement space 30 including the pair of reduced spaces 34 and the pair of enlarged spaces 35 is formed between the two high voltage electric wires 19 and the pipe inner surface 29.

When the ring-like cap engagement space 30 is formed at the terminal crushed part 28, it becomes possible to engage the conducting path protective cap 25 in a state that the end surface 31 is covered. If the end surface 31 is covered using the conducting path protective cap 25, even if the edge of the end surface 31 or temporary burr occurs, the insulators (coatings) of the high voltage electric wires 19 will not be hurt.

The conducting path protective cap 25, as shown in FIG. 2D, is formed into an illustrated shape which has a ring-like engaging part 36 which is engaged with the pipe inner surface 29 by being inserted into the ring-like (oval) cap engagement space 30, and a ring-like end surface facing part 37 which faces the end surface 31 (as an example). The conducting path protective cap 25 is formed to have an oval appearance in accordance with the shapes of the ring-like cap engagement space 30 and the terminal crushed part 28.

A reference number 38 in the conducting path protective cap 25 shows a through hole for the two high voltage electric wires 19. The curved surface 24 is formed at the opening border of the through hole 38.

The conducting path protective cap 25 may be merely in an engaged state with the metal pipe 21, and may be fixed to the pipe outer surface 26 by, for example, tape winding.

As described above with reference to FIGS. 1A to 2D, according to the present embodiment, the coating-protective cap 25 can be engaged without upsizing the inside diameter of the metal pipe 21. Because the wire harness 9 includes the metal pipe 21, whose diameter is small, in construction, for example, even if the wire harness 9 is wired at the ground side of the vehicle body floor 15, it is possible to wire the wire harness 9 while the distance from the ground is increased. Therefore, an effect is achieved that it is harder for the wire harness 9 to get hurt remarkably than before.

It is apparent that various modifications can be made to the invention without changing the purpose of the invention.

The description is made above when there are two high voltage electric wires 19, but the high voltage electric wires 19 shall not be limited to this number. That is, as shown in FIG. 3A, there may be three high voltage electric wires, and, as shown in FIG. 3B, there may be four high voltage electric wires.

In FIG. 3A, reference numbers 51 show high voltage electric wires, a reference number 52 shows a terminal part of a metal pipe, a reference number 53 shows the end surface of the terminal part 52, a reference number 54 shows a terminal crushed part which is deformed into a generally triangular shape by being crushed from the arrow C direction, a reference number 55 shows a cap engagement space which is formed due to the formation of the terminal crushed part 54, reference numbers 56 and 57 show reduced spaces and enlarged spaces of the cap engagement space 55, and arrows D show acting directions and enlarging directions.

Further, in FIG. 3B, reference numbers 61 show high voltage electric wires, a reference number 62 shows a terminal part of a metal pipe, a reference number 63 shows the end surface of the terminal part 62, a reference number 64 shows a terminal crushed part which is deformed into a generally quadrangular shape by being crushed from the arrow E direction, a reference number 65 shows a cap engagement space which is formed due to the formation of the terminal crushed part 64, reference numbers 66 and 67 show reduced spaces and enlarged spaces of the cap engagement space 65, and arrows F show acting directions and enlarging directions.

Even if there are three high voltage electric wires as shown in FIG. 3A or there are four high voltage electric wires as shown in FIG. 3B, the coating-protective cap (not shown in the figures) can be engaged without upsizing the inside diameter of the metal pipe, and the insulator (coating) can be prevented from being hurt.

According to the wire harness described above, a circular-shape cap engagement space formed in the pipe inner surface is partly enlarged and partly reduced due to the crush of the metal pipe to accept a protective cap in the space. Thus, it is possible to engage the metal pipe with a coating-protective cap without upsizing the metal pipe.

What is claimed is:

1. A wire harness, comprising:
a plurality of conducting paths;
a metal pipe into which the plurality of conducting paths are inserted; and
a conducting path protective cap which includes a through hole for the plurality of conducting paths, and an engaging part which is engaged with a terminal part of the metal pipe, wherein
the terminal part of the metal pipe has a non-circular cross section,
the terminal part of the metal pipe has a ring-like cap engagement space between the plurality of conducting paths and a pipe inner surface of the metal pipe,
the ring-like cap engagement space includes a reduced space and an enlarged space, wherein the reduced part is formed by narrowing a part of a gap between the plurality of conducting paths and the pipe inner surface, and the enlarged space is formed by enlarging a part of the gap in accordance with a formation of the reduced space, and
the conducting path protective cap has a non-circular cross section being the same shape as the non-circular cross section of the terminal part of the metal pipe,
wherein a diameter of a body portion of the metal pipe other than the terminal part is sized such that a gap between the plurality of conducting paths and a pipe inner surface of the body portion of the metal pipe is smaller than a thickness of the engaging part of the conducting path protective cap.

2. The wire harness according to claim 1, wherein
a shape of the non-circular cross section of the terminal part of the metal pipe is dependent upon the number of conducting paths of the plurality of conducting paths which are inserted in the metal pipe.

3. The wire harness according to claim 2, wherein
the plurality of conducting paths includes two conducting paths aligned with each other, and
the non-circular cross section of the terminal part of the metal pipe is an oval shape due to the crushing of the terminal part to form a pair of reduced spaces and a pair of enlarged spaces between the two conducting paths and the pipe inner surface of the terminal part of the metal pipe.

4. The wire harness according to claim 1, wherein
a portion of the metal pipe other than the terminal portion has a cross section other than the non-circular cross section of the terminal part.

* * * * *